(12) United States Patent
Zhang et al.

(10) Patent No.: US 11,979,260 B2
(45) Date of Patent: May 7, 2024

(54) BP EQUALIZATION METHOD, DEVICE, COMMUNICATION APPARATUS AND STORAGE MEDIUM

(71) Applicant: XI'AN ZHONGXING NEW SOFTWARE CO., LTD., Xi'an (CN)

(72) Inventors: Haoyuan Zhang, Shenzhen (CN); Xingxing Ai, Shenzhen (CN); Yuan Liu, Shenzhen (CN); Jun Li, Shenzhen (CN)

(73) Assignee: XI'AN ZHONGXING NEW SOFTWARE CO., LTD., Xi'an (CN)

( * ) Notice: Subject to any disclaimer, the term of this patent is extended or adjusted under 35 U.S.C. 154(b) by 103 days.

(21) Appl. No.: 17/762,972

(22) PCT Filed: Sep. 23, 2020

(86) PCT No.: PCT/CN2020/117160
§ 371 (c)(1),
(2) Date: Mar. 23, 2022

(87) PCT Pub. No.: WO2021/057798
PCT Pub. Date: Apr. 1, 2021

(65) Prior Publication Data
US 2022/0353111 A1 Nov. 3, 2022

(30) Foreign Application Priority Data
Sep. 24, 2019 (CN) .......................... 201910907176.8

(51) Int. Cl.
*H03D 1/00* (2006.01)
*H04L 25/02* (2006.01)
(Continued)

(52) U.S. Cl.
CPC ...... *H04L 25/0242* (2013.01); *H04L 25/0236* (2013.01); *H04L 25/03305* (2013.01)

(58) Field of Classification Search
CPC ............ H04L 25/0242; H04L 25/0236; H04L 25/03305; H04L 25/03197
(Continued)

(56) References Cited

U.S. PATENT DOCUMENTS

2009/0257530 A1* 10/2009 Shim ................. H04L 25/03197
375/340

FOREIGN PATENT DOCUMENTS

| CN | 101841375 A | 9/2010 |
| CN | 101909028 A | 12/2010 |

(Continued)

OTHER PUBLICATIONS

Datta, et al. "A Hybrid RTS-BP Algorithm for Improved Detection of Large-MIMO M-QAM Signals," Indian Institute of Science Department of ECE, Jan. 14, 2010, pp. 1-6.
(Continued)

*Primary Examiner* — Phuong Phu
(74) *Attorney, Agent, or Firm* — Vivacqua Crane, PLLC (57) ABSTRACT

A Belief Propagation (BP) equalization method and apparatus, a communication device and a storage medium are disclosed. The method may include: splitting a received signal $Y_c$, a channel estimation $H_c$ and a symbol estimation $X_c$ into real parts and imaginary parts to obtain a received signal matrix Y, a channel estimation matrix H and a symbol estimation matrix X (S101); performing orthogonal triangular (QR) decomposition on the channel estimation matrix H to obtain an equivalent received signal $Y_{bp}$, an equivalent channel R and a noise power $\sigma^2$ (S102); and performing iteration based on the equivalent received signal $Y_{bp}$, the equivalent channel R and the noise power $\sigma^2$ to obtain a position probability of per stream symbol (S103).

12 Claims, 3 Drawing Sheets (51) Int. Cl.
*H04L 25/03* (2006.01)
*H04L 27/06* (2006.01)

(58) Field of Classification Search
USPC .......................................... 375/341, 262, 265
See application file for complete search history.

(56) References Cited

FOREIGN PATENT DOCUMENTS

CN          107005504 A     8/2017
WO          2011106571 A2   9/2011

OTHER PUBLICATIONS

European Patent Office. Extended European Search Report for EP Application No. 20870183.9, dated Oct. 12, 2022, pp. 1-9.
Li, et al. "Semidefinite further relaxation on likelihood ascent search detection algorithm for high-order modulation in massive MIMO system," The Institution of Engineering and Techology Journals, vol. 11, No. 6, 2017, pp. 801-808.
International Searching Authority. International Search Report and Written Opinion for PCT Application No. PCT/CN2020/117160 and English translation, dated Dec. 21, 2020, pp. 1-9.
Zarzoso, et al. Blind Channel Equalization With Algebraic Optimal Step Size, 13th European Signal Processing Conference, EUSIPCO 2005, Antalya, Turkey, Sep. 2005, pp. 1-4.

\* cited by examiner

BP EQUALIZATION METHOD, DEVICE, COMMUNICATION APPARATUS AND STORAGE MEDIUM

CROSS-REFERENCE TO RELATED APPLICATION

This application is a national stage filing under 35 U.S.C. § 371 of international application number PCT/CN2020/117160, filed on Sep. 23, 2020, which claims priority to Chinese patent application No. 201910907176.8 filed on Sep. 24, 2019. The contents of these applications are incorporated herein by reference in their entirety.

TECHNICAL FIELD

The present disclosure relates to the technical field of communication, and in particular, to a Belief Propagation (BP) equalization method and apparatus, a communication device and a non-transitory computer-readable storage medium.

BACKGROUND

Equalization in the field of communication refers to equalization of characteristics of a channel. That is, a receiver produces characteristics opposite to those of the channel to cancel inter-symbol interference caused by time-varying and multipath effects. In multi-user detection, equalization technologies adopted include Zero Forcing (ZF), Minimum Mean Square Error (MMSE), Interference Rejection Combining (IRC), Sphere Decoding (SD) and BP algorithms. The BP algorithm uses a Factor Graph (FG) idea to update belief information between nodes iteratively. The performance is better than that of a linear equalization algorithm, and the implementation complexity is lower than that of a conventional linear equalization algorithm because no large matrix inverse operation is required. In some cases, the BP equalization algorithm is mainly implemented in two manners, namely Factor Graph based Graphical Model with Gaussian Approximation of Interference (FG-GAI) and Channel Hardening-Exploiting Message Passing (CHEMP). FG-GAI and CHEMP both have problems of high costs and limited application scenarios.

SUMMARY

According to some embodiments of the present disclosure, a BP equalization method and apparatus, a communication device and a non-transitory computer-readable storage medium are provided, so as to solve at least to some extent the problems of high overhead and limited application scenarios in the BP equalization algorithm in some cases.

In view of the above, according to an embodiment of the present disclosure, a BP equalization method is provided. The method may include: splitting a received signal $Y_c$, a channel estimation $H_c$ and a symbol estimation $X_c$ into real parts and imaginary parts to obtain a received signal matrix Y, a channel estimation matrix H and a symbol estimation matrix X; performing orthogonal triangular (QR) decomposition on the channel estimation matrix H to obtain an equivalent received signal $Y_{bp}$, an equivalent channel R and a noise power $\sigma^2$; and performing iteration based on the equivalent received signal $Y_{bp}$, the equivalent channel R and the noise power $\sigma_2$ to obtain a position probability of per stream symbol.

According to another embodiment of the present disclosure, a BP equalization apparatus is further provided. The apparatus may include: a splitting module, a decomposition module and an iteration module. The splitting module is configured to split a received signal $Y_c$, a channel estimation $H_c$ and a symbol estimation $X_c$ into real parts and imaginary parts to obtain a received signal matrix Y, a channel estimation matrix H and a symbol estimation matrix X. The decomposition module is configured to perform QR decomposition on the channel estimation matrix H to obtain an equivalent received signal $Y_{bp}$, an equivalent channel R and a noise power $\sigma^2$. The iteration module is configured to perform iteration based on the equivalent received signal $Y_{bp}$, the equivalent channel R and the noise power $\sigma^2$ to obtain a position probability of per stream symbol.

According to yet another embodiment of the present disclosure, a communication device is further provided. The device may include a processor, a memory and a communication bus. The communication bus is configured to connect the processor to the memory. The processor is configured to execute a computer program stored in the memory to carry out the BP equalization method as described above.

According to yet another embodiment of the present disclosure, provided is a non-transitory computer-readable storage medium storing one or more computer programs, where the one or more computer programs, when executed by one or more processors, cause the one or more processors to carry out the BP equalization method as described above.

Other features and corresponding beneficial effects of the present disclosure will be set forth in part in the description which follows, and it is to be understood that at least part of the beneficial effects will become apparent from the description of the present disclosure.

DETAILED DESCRIPTION

In order to make objects, technical schemes and advantages of the present disclosure clear, embodiments of the present disclosure are described in further detail below with reference to specific implementations in conjunction with the drawings. It is to be understood that the embodiments described herein are intended only to illustrate and not to limit the present disclosure.

Example Embodiment One

In view of the problems of high overhead and limited application scenarios in a BP equalization algorithm in some cases, a BP equalization method is provided according to an embodiment. The method involves performing QR decomposition on a channel estimation matrix H, so that an update dimension is the number of streams multiplied by the number of streams, which does not increase with the number of antennas, achieving dimensionality reduction and being more suitable for Massive MIMO multi-user detection scenarios. Thus, the application scenarios of the BP equalization method are expanded. At the same time, since an R matrix is an upper triangular matrix, and only non-zero nodes need to be iterated during iteration, the computation overhead can be further reduced and the accuracy of symbol estimation in the equalization algorithm can be improved. The BP equalization algorithm according to this embodiment is applicable to a variety of communication devices, including at least one of a variety of network-side communication devices and a variety of terminal-side communication devices. Moreover, the BP equalization algorithm according to this embodiment is also applicable to QR-GAI algorithms of any-order QAM. For easy understanding, the BP equalization algorithm according to this embodiment may be called a QR-GAI algorithm.

Figure 1:
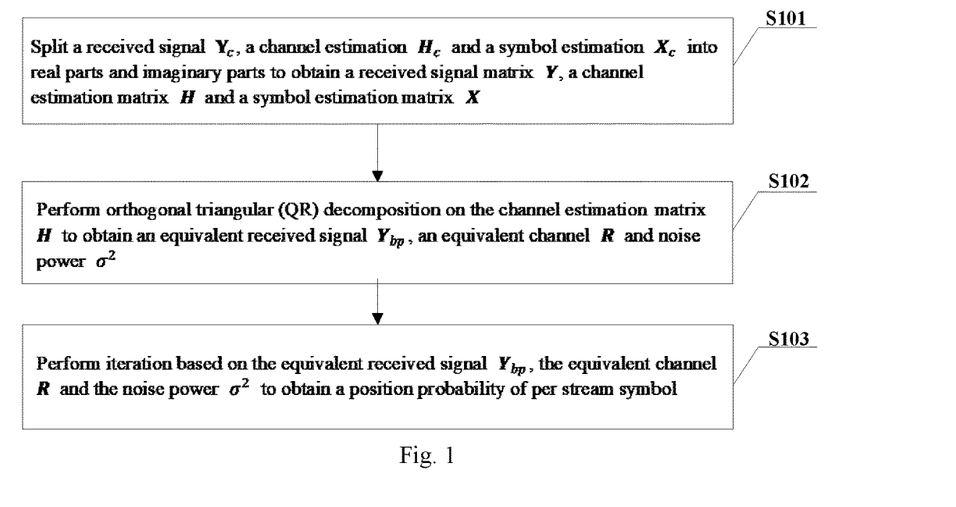
FIG. 1 is a schematic flowchart of a BP equalization method according to example embodiment one of the present disclosure.

For easy understanding, this embodiment is illustrated below by taking the schematic flowchart of the BP equalization method shown in FIG. 1 as an example, including steps S101 to S103.

At S101, a received signal $Y_c$, a channel estimation $H_c$ and a symbol estimation $X_c$ are split into real parts and imaginary parts to obtain a received signal matrix Y, a channel estimation matrix H and a symbol estimation matrix X.

The received signal $Y_c$ in this embodiment may be a received signal of a communication device. The communication device may be a network-side communication device, which, for example, may include, but is not limited to, a variety of base stations. Certainly, in some examples, the communication device may also include a variety of terminal-side communication devices. In this embodiment, after receiving the received signal $Y_c$, the communication device may perform the BP equalization method shown in FIG. 1 in this embodiment.

In this embodiment, S101 is intended to split a complex field QAM constellation point into two real number field PAM constellation points to allow for a real number field operation in subsequent steps.

In this embodiment, a receiving model may be flexibly arranged according to a specific application scenario. In an example, for the received signal $Y_c$, the channel estimation $H_c$ and the symbol estimation $X_c$, the receiving model (it is to be understood that the receiving model is not limited to the following example model, and may be flexibly adjusted as required) may be arranged as follows:

$$Y_c = H_c X_c + N_c;$$

where the received signal satisfies $Y_c \in C^{ante \times 1}$; the channel estimation satisfies $H_c \in C^{ante \times flow}$; the symbol estimation satisfies $X_c \in C^{flow \times 1}$; the white Gaussian noise satisfies $N_c \in C^{ante \times 1}$, with a mean of 0 and a variance of $2 \cdot \sigma^2$; C denotes a complex field; ante denotes the number of antennas; flow denotes the number of streams; and $\sigma^2$ denotes a noise power.

Correspondingly, a received signal matrix Y, a channel estimation matrix H and a symbol estimation matrix $S_{\sigma^2,ONI}$ obtained through splitting into real parts and imaginary parts satisfy:

$$Y = HX + N;$$

where the received signal matrix satisfies $$Y = \begin{bmatrix} \text{Re}\{Y_c\} \\ \text{Im}\{Y_c\} \end{bmatrix} \in R^{2 \cdot ante \times 1};$$

the channel estimation matrix satisfies $$H = \begin{bmatrix} \text{Re}\{H_c\} & -\text{Im}\{H_c\} \\ \text{Im}\{H_c\} & \text{Re}\{H_c\} \end{bmatrix} \in R^{2 \cdot ante \times 2 \cdot flow};$$

the symbol estimation matrix satisfies $$X = \begin{bmatrix} \text{Re}\{X_c\} \\ \text{Im}\{X_c\} \end{bmatrix} \in R^{2 \cdot flow \times 1}; \text{Re}\{.\}$$

denotes taking a real part, and Im{.} denotes taking an imaginary part.

At S102, QR decomposition is performed on the channel estimation matrix H to obtain an equivalent received signal $Y_{bp}$, an equivalent channel R and a noise power $\sigma^2$; so as to serve as input in a next step.

In an example of this embodiment, QR decomposition is performed on the channel estimation matrix H to obtain:

$$Y = HX + N = QRX + N;$$

and according to Y=HX+N=QRX+N, the following is obtained:

$$Y_{bp} \triangleq Q^T Y = RX + Q^T N \in R^{2 \cdot flow \times 1};$$

where the equivalent noise $Q^T N$ has a mean of 0, and the noise power is $\sigma^2$.

The QR decomposition performed on the channel estimate H=QR∈$R^{2 \cdot ante \times 2 \cdot flow}$ in this step has at least the following advantages. 1) The equivalent channel R has a dimension of R∈$R^{2 \cdot flow \times 2 \cdot flow}$, which under Massive MIMO, is much smaller than an original channel dimension H∈$R^{2 \cdot ante \times 2 \cdot flow}$, thereby greatly reducing the complexity of subsequent iterative algorithms. 2) According to characteristics of a unitary matrix, var($Q^T N$)=var(N), that is, the noise power is constant, where var(.) denotes a variance. 3) Since R denotes an upper triangular matrix, only non-zero elements need to be updated in subsequent iteration, which can further reduce the computation overhead.

At S103, iteration is performed based on the equivalent received signal $Y_{bp}$, the equivalent channel R and the noise power $\sigma^2$ to obtain a position probability of per stream symbol.

For example, to be continued with the above example, the performing iteration based on the equivalent received signal $Y_{bp}$, the equivalent channel R and the noise power $\sigma^2$ to obtain a position probability of per stream symbol may include:

constructing a fully connected BP network by taking the equivalent received signal $Y_{bp}$ as an Observation Node and the symbol estimation matrix X as a Symbol Node, and initializing a per stream symbol position probability as $$Pro = \frac{1}{M} \cdot I_{M \times 2 \cdot flow},$$

M being an order of QAM, that is, $2^M$ QAM; calculating an equivalent received signal mean $S_{u,ONI}$ and an equivalent received signal variance estimate $S_{\sigma^2,ONI}$ on each observation node index ONI={2·flow, . . . , 1}. To be continued with the above example, the process may include:

$$S_{u,ONI} = \sum_{SNI=ONI}^{2 \cdot flow} R(ONI, SNI) \cdot \left( \sum_{i=1}^{M} si(i) \cdot pro(i, SNI) \right) / \beta;$$

and $$S_{\sigma^2,ONI} = \sum_{SNI=ONI}^{2 \cdot flow} |R(ONI, SNI)|^2 \cdot \left( \sum_{i=1}^{M} (si(i))^2 \cdot pro(i, SNI) \right) / \beta^2 + \sigma^2;$$

where $$\left( \sum_{i=1}^{M} si(i) \cdot pro(i, SNI) \right) / \beta$$

denotes a per stream estimate, $$\left( \sum_{i=1}^{M} (si(i))^2 \cdot pro(i, SNI) \right) / \beta^2$$

denotes a per symbol variance estimate, SNI denotes a stream index, and β denotes a symbol energy normalization factor. For example, for 4QAM, 16QAM, 64QAM and 256QAM, values of β are $\sqrt{2}$, $\sqrt{10}$, $\sqrt{42}$, $\sqrt{150}$, respectively. QAM of other orders may be deduced by analogy, which are not described in detail herein.

After the equivalent received signal mean $S_{u,ONI}$ and the equivalent received signal variance estimate $S_{\sigma^2,ONI}$ are obtained, a per stream symbol likelihood probability $llr \in R^{M \times 1}$ and a per stream belief probability $proT \in R^{M \times 1}$ may be calculated according to $S_{u,ONI}$ and $S_{\sigma^2,ONI}$.

In order to further improve the accuracy of symbol estimation in the equalization algorithm, before the per stream symbol likelihood probability $llr \in R^{M \times 1}$ and the per stream belief probability $proT \in R^{M \times 1}$ are calculated according to $S_{u,ONI}$ and $S_{\sigma^2,ONI}$ a mean and a variance of a stream ONI may be removed from the equivalent received signal mean $S_{u,ONI}$ and the equivalent received signal variance estimate $S_{\sigma^2,ONI}$ according to a principle of Extrinsic Information to obtain μ and s. The process is as follows:

$$\mu = S_{u,ONI} - R(ONI, ONI) \cdot \left( \sum_{i=1}^{M} si(i) \cdot pro(i, ONI) \right) / \beta; \text{ and}$$

-continued $$s = S_{\sigma^2,ONI} - |R(ONI, ONI)|^2 \cdot \left( \sum_{i=1}^{M} (si(i))^2 \cdot pro(i, ONI) \right) / \beta^2 + \sigma^2.$$

μ and s obtained above are obtained by removing a mean and a variance of the equivalent received signal of the ONI stream from Observation Node ONI.

In the above step, since R is an upper triangular matrix, only ONI={2·flow, . . . , 1} and SNI={ONI, . . . , 2·flow} need to be traversed. In this way, iteration overhead of the QR-GAI algorithm can be further reduced. In addition, GAI white noise estimation (GAI estimation performance deteriorates significantly under high channel correlation) is not required for nodes of ONI=2·flow due to the absence of inter-stream interference. Therefore, a Log Likelihood Ratio (LLR) belief probability is high, which makes the iterative algorithm have dominant nodes in the iteration, thereby improving the estimation performance of the overall iterative algorithm.

In an example of this embodiment, a per stream symbol likelihood probability $llr \in R^{M \times 1}$ and a per stream belief probability $proT \in R^{M \times 1}$ are calculated according to the equivalent received signal mean $S_{u,ONI}$ and the equivalent received signal variance estimate $S_{\sigma^2,ONI}$.

The process of calculating the per stream symbol likelihood probability $llr \in R^{M \times 1}$ includes: defining a symbol index vector $$si = \left\{ 2^{\frac{M}{2}} - 1, 2^{\frac{M}{2}} - 3, \ldots, -2^{\frac{M}{2}} + 1 \right\} \in R^{2^{\frac{M}{2}} \times 1},$$

and for an index i=1, 2, . . . , M, calculating the per stream symbol likelihood probability $llr \in R^{M \times 1}$ according to the following formulas:

$$llr(i) = \ln \frac{Pr(Y_{bp}(ONI) \mid X(ONI) = si(0)/\beta)}{Pr(Y_{bp}(ONI) \mid X(ONI) = si(i)/\beta)} =$$

$$\frac{(2 \cdot (Y_{bp}(ONI) - \mu) - R(ONI, ONI) \cdot (si(i) + si(0))/\beta) \cdot R(ONI, ONI) \cdot (si(i) - si(0))/\beta}{s^2}$$

where llr(i) denotes a likelihood ratio of . . . $s^2$, . . . ool X(ONI) being si(0)/β to being si(i)β at an $i^{th}$ symbol position, i=1, 2, . . . , M.

Then, the per stream belief probability $proT \in R^{M \times 1}$ is calculated according to the following formulas:

proT(i)=exp(llr(i))/Σ$_i$ exp(llr(i));

where proT(i) denotes a probability that an $ONI^{th}$ stream symbol X(ONI) is si(i)/β.

In some examples of this embodiment, in order to prevent probability jumps in adjacent iteration cycles, the performing iteration based on the equivalent received signal $Y_{bp}$, the equivalent channel R and the noise power $\sigma^2$ to obtain a position probability of per stream symbol may further include updating the $ONI^{th}$ stream symbol with the following damping algorithm:

pro(:,ONI)=df·pro(:,ONI)+(1−df)·proT);

where pro(:,ONI) denotes all rows and ONI columns, and df denotes a damping factor. The value of df in this embodiment may be flexibly determined. In an example, the value may be any value from 0.2 to 0.3.

In this embodiment, after the per stream symbol position probability is obtained through S103, the obtained per stream symbol position probability may be applied flexibly as required.

In an example of this embodiment, a complex QAM constellation point of per stream symbol SNI={1, . . . , flow} may be calculated by utilizing the obtained per stream symbol position probability, so as to output a per stream symbol bit-level LLR probability.

The calculating a complex QAM constellation point of per stream symbol SNI={1, . . . , flow} includes:

$$rp = \mathop{\mathrm{argmax}}_{i}(pro(i, SNI)); \text{ and}$$

$$ip = \mathop{\mathrm{argmax}}_{i}(pro(i, SNI + \text{flow}));$$

where pro(rp,SNI) and pro (ip,SNI+flow) denote probabilities of real-value symbol positions of a real part and an imaginary part of an SNI$^{th}$ stream.

In some examples, pro(rp,SNI) and pro(ip,SNI+flow) may be directly used as decoding module input. In some examples, the BP equalization method in this embodiment further includes calculating a symbol hard decision, including:

$$\hat{X}(SNI) = \frac{(si(rp) + si(ip) \cdot j)}{\beta};$$

where $\hat{X}$(SNI) denotes a hard decision value of a per stream $2^M$ QAM complex symbol, and j denotes the imaginary part.

The QR-GAI algorithm according to this embodiment has at least the following advantages over the FG-GAI algorithm in some cases. 1) Dimensionality reduction is realized, and computation overhead in Massive MIMO scenarios is greatly reduced. 2) A high belief probability of a last stream is guaranteed by a Successive Interference Cancellation (SIC) principle, and the accuracy of multi-user detection is improved. 3) Only non-zero elements of an R matrix are updated during the iteration, which further reduces the computation overhead. In addition, the QR-GAI algorithm according to this embodiment has at least the following advantages over the CHEMP algorithm. 1) The dimensionality reduction operation does not increase the noise power, and improves the accuracy of symbol estimation. 2) A high belief probability of a last stream is guaranteed by the SIC principle. 3) The equivalent channel R matrix is sparser than a covariance matrix of H, which makes the algorithm still applicable under high channel correlation. In addition, the QR-GAI algorithm according to this embodiment may be extended to QAM of any order. The application scenarios can be further expanded.

Example Embodiment Two

For easy understanding, the QR-GAI algorithm shown in example embodiment one of this embodiment is illustrated in combination with two application scenarios based on 4QAM and 16QAM.

Figure 2:
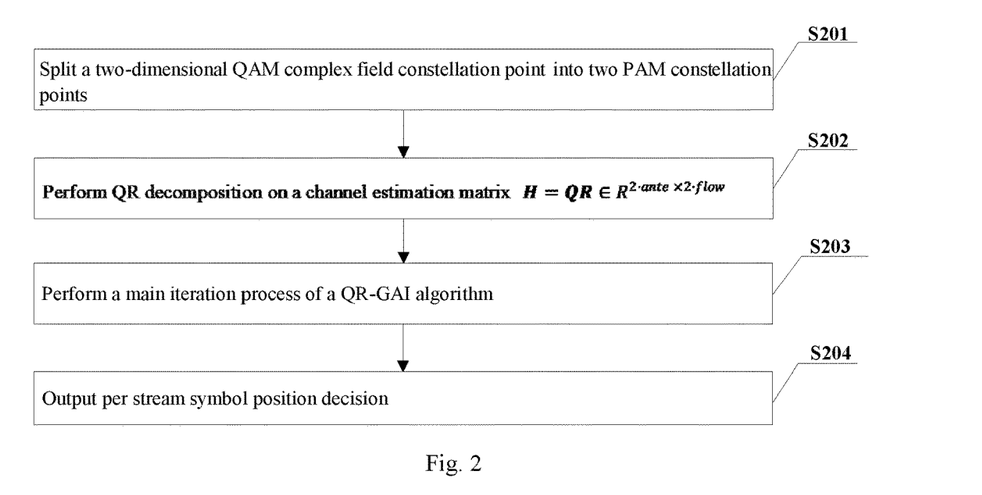
FIG. 2 is a schematic flowchart of a 4 quadrature amplitude modulation (QAM)-based BP equalization method according to example embodiment two of the present disclosure.

Example one: Refer to FIG. 2, a 4QAM-based QR-GAI equalization process includes steps S201 to S204.

At S201, a two-dimensional QAM complex field constellation point is split into two PAM constellation points. A received signal $Y_c = H_c X_c + N_c$ is split into a real part and an imaginary part to obtain:

$$Y = \begin{bmatrix} \mathrm{Re}\{Y_c\} \\ \mathrm{Im}\{Y_c\} \end{bmatrix} \in R^{2 \cdot ante \times 1};$$

$$H = \begin{bmatrix} \mathrm{Re}\{H_c\} & -\mathrm{Im}\{H_c\} \\ \mathrm{Im}\{H_c\} & \mathrm{Re}\{H_c\} \end{bmatrix} \in R^{2 \cdot ante \times 2 \cdot flow}; \text{ and}$$

$$X = \begin{bmatrix} \mathrm{Re}\{X_c\} \\ \mathrm{Im}\{X_c\} \end{bmatrix} \in R^{2 \cdot flow \times 1};$$

where Y=HX+N is satisfied.

At S202, QR decomposition is performed on a channel estimation matrix H=QR∈$R^{2 \cdot ante \times 2 \cdot flow}$ to obtain $Y_{bp} \triangleq Q^T Y = RX + Q^T N \in R^{2 \cdot flow \times 1}$. In this example, equivalent noise $Q^T N$ has a mean of 0 and a variance of $\sigma^2$. Input $Y_{bp} \in R^{2 \cdot flow \times 1}$, R∈$R^{2 \cdot flow \times 2 \cdot flow}$ and $\sigma^2$ at S203 is obtained.

Figure 3:
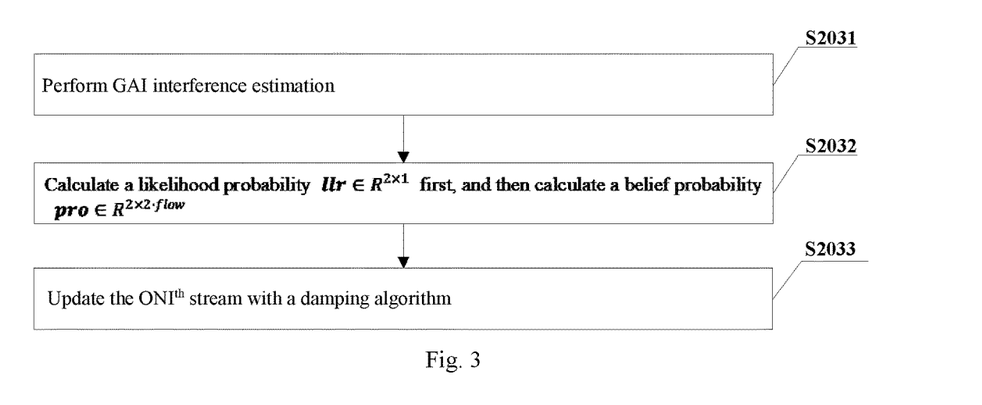
FIG. 3 is a schematic diagram of a main iteration process of a QR-GAI algorithm according to example embodiment two of the present disclosure.

At S203, a main iteration process of a QR-GAI algorithm is performed. In this example, a fully connected BP network is constructed, with an Observation Node of $Y_{bp} \in R^{2 \cdot flow \times 1}$ and an Information Node of X∈$R^{2 \cdot flow \times 1}$. Per stream position probability $$Pro = \frac{1}{M} \cdot I_{M \times 2 \cdot flow}$$

is initialized, where M denotes an order of QAM, and for 4QAM, Pro=0.5·$I_{2 \times 2 \cdot flow}$. In this example, referring to FIG. 3, the process includes steps S2031 to S2033.

At S2031, GAI interference estimation is performed, and for each Observation Node the following processing is performed:

$$S_{u,ONI} = \Sigma_{SNI=ONI}^{2 \cdot flow} R(ONI,SNI) \cdot (2 \cdot Pro(1,SNI) - 1)\sqrt{2};$$
and $$S_{\sigma^2,ONI} = \Sigma_{SNI=ONI}^{2 \cdot flow} |R(ONI,SNI)|^2 \cdot 2 \cdot Pro(1,SNI) \cdot (1 - Pro(1,SNI)) + \sigma^2;$$

where SNI={ONI, . . . , 2·flow} denotes a Symbol Node index, (2·Pro(1, SNI)−1)/$\sqrt{2}$ denotes per stream symbol estimate, $S_{u,ONI}$ denotes an equivalent received signal mean on Observation Node ONI, 2·Pro(1,SNI)·(1−Pro(1,SNI)) denotes per stream variance estimate, $S_{\sigma^2,ONI}$ denotes an equivalent received signal variance estimate on Observation Node ONI, and $\sigma^2$ denotes a noise power value.

According to a principle of Extrinsic Information, a mean and a variance of a stream ONI are removed to obtain:

$$\mu = S_{u,ONI} - R(ONI,ONI) \cdot (2 \cdot Pro(1,ONI) - 1)/\sqrt{2}; \text{ and}$$

$$s = S_{\sigma^2,ONI} - |R(ONI,ONI)|^2 \cdot 2 \cdot Pro(1,ONI) \cdot (1 - Pro(1,ONI));$$

where μ and s obtained above are obtained by removing a mean and a variance of the equivalent received signal of the stream ONI from Observation Node ONI.

At S2032, a likelihood probability llr∈$R^{2 \times 1}$ is calculated first, and then a belief probability pro∈$R^{2 \times 2 \cdot flow}$ is calculated. Criteria for calculating likelihood probability llr∈$R^{2 \times 1}$ are:

$$llr(1) = 0; \text{ and}$$

$$llr(2) = 2/s \cdot R(ONI,ONI) \cdot (Y_{bp}(ONI) - \mu);$$

where llr(1) denotes a likelihood ratio of an ONI$^{th}$ stream symbol being +$\sqrt{2}$/2 to being +$\sqrt{2}$/2, with the value being 0. llr(2) denotes a likelihood ratio of an ONI$^{th}$ stream symbol being +$\sqrt{2}$/2 to being −$\sqrt{2}$/2.

The belief probability pro∈$R^{2 \times 2 \cdot flow}$ is calculated, and update criteria of a temporary belief probability proT∈$R^{2 \times 1}$ are defined as:

proT(1)=exp($llr$(1))/(exp($llr$(1))+exp($llr$(2))); and proT(2)=exp($llr$(2))/(exp($llr$(1))+exp($llr$(2)));

where proT(1) and proT(2) denote probabilities of the ONI$^{th}$ stream symbol being +$\sqrt{2}$/2 and −$\sqrt{2}$/2, respectively.

At S2033, the ONI$^{th}$ stream is updated with a damping algorithm to obtain:

pro(:,ONI)=df·pro(:,ONI)+(1−df·proT);

where df denotes a damping factor, and the value of df in this example may be any value from 0.2 to 0.3.

At S204, per stream symbol position decision is outputted. A symbol vector si={1,−1} is defined, and for a complex QAM constellation point of each stream SNI={1, . . . , flow}, $$rp = \underset{i}{\operatorname{argmax}}(pro(i, SNI)); \text{ and}$$

$$ip = \underset{i}{\operatorname{argmax}}(pro(i, SNI + \text{flow}));$$

where pro(rp,SNI) and pro(ip,SNI+flow) denote probabilities of real value symbol positions of a real part and an imaginary part of an SNI stream, which may be directly used as decoding module input.

In this example, for a symbol hard decision, $$\hat{X}(SNI) = \frac{(si(rp) + si(ip) \cdot j)}{\sqrt{2}};$$

where $\hat{X}$(SNI) denotes a hard decision value of a 4QAM symbol of an SNI$^{th}$ stream.

Figure 4:
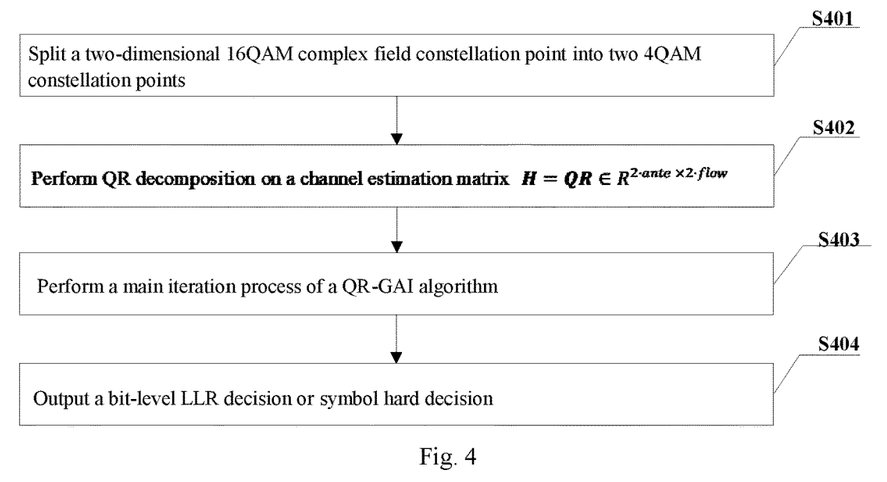
FIG. 4 is a schematic flowchart of a 16QAM-based BP equalization method according to example embodiment two of the present disclosure.

Example two: Refer to FIG. 4, a 16QAM-based QR-GAI equalization process include steps S401 to S404.

At S401, a two-dimensional 16QAM complex field constellation point is split into two 4QAM constellation points. A received signal $Y_c=H_cX_c+N_c$ is split into a real part and an imaginary part to obtain:

$$Y = \begin{bmatrix} \operatorname{Re}\{Y_c\} \\ \operatorname{Im}\{Y_c\} \end{bmatrix} \in R^{2 \cdot ante \times 1}; H = \begin{bmatrix} \operatorname{Re}\{H_c\} & -\operatorname{Im}\{H_c\} \\ \operatorname{Im}\{H_c\} & \operatorname{Re}\{H_c\} \end{bmatrix} \in R^{2 \cdot ante \times 2 \cdot flow};$$

$$\text{and } X = \begin{bmatrix} \operatorname{Re}\{X_c\} \\ \operatorname{Im}\{X_c\} \end{bmatrix} \in R^{2 \cdot flow \times 1};$$

where Y=HX+N is satisfied.

At S402, QR decomposition is performed on a channel estimation matrix H=QR∈$R^{2 \cdot ante \times 2 \cdot flow}$ to obtain $Y_{bp} \triangleq Q^TY=RX+Q^TN \in R^{2 \cdot flow \times 1}$. In this example, equivalent noise $Q^TN$ has a mean of 0 and a variance of $\sigma^2$. Input $Y_{bp} \in R^{2 \cdot flow \times 1}$, R∈$R^{2 \cdot flow \times 2 \cdot flow}$ and $\sigma^2$ at S203 is obtained.

At S403, a main iteration process of a QR-GAI algorithm is performed. A fully connected BP network is constructed, with an Observation Node of $Y_{bp} \in R^{2 \cdot flow \times 1}$ and an Information Node of X∈$R^{2 \cdot flow \times 1}$. A belief probability Pro=¼·$I_{4 \times 2 \cdot flow}$ is initialized. The process includes sub-steps a) to c).

At sub-step a), GAI interference estimation is performed. For each Observation Node ONI={2·flow, . . . , 1}, a symbol vector si={3,1,−1,−3} is defined to obtain:

$$S_{u, ONI} = \sum\nolimits_{SNI=ONI}^{2 \cdot flow} R(ONI, SNI) \cdot \left( \sum_{i=1}^{4} si(i) \cdot pro(i, SNI) \right) \Big/ \sqrt{10};$$

and $$S_{\sigma^2, ONI} = \sum\nolimits_{SNI=ONI}^{2 \cdot flow} |R(ONI, SNI)|^2 \cdot \left( \sum_{i=1}^{4} (si(i))^2 \cdot pro(i, SNI) \right) \Big/ 10 + \sigma^2;$$

where $S_{u,ONI}$ denotes an equivalent received signal mean on Observation Node ONI, $S_{\sigma^2,ONI}$ denotes an equivalent received signal variance estimate on Observation Node ONI, and $\sigma^2$ denotes a noise power value.

A mean and a variance of the stream ONI are removed to obtain:

$$\mu = S_{u, ONI} - R(ONI, ONI) \cdot \left( \sum_{i=1}^{4} si(i) \cdot pro(i, ONI) \right) \Big/ \sqrt{10}; \text{ and}$$

$$s = S_{\sigma^2, ONI} - |R(ONI, ONI)|^2 \cdot \left( \sum_{i=1}^{4} (si(i))^2 \cdot pro(i, ONI) \right) \Big/ 10 + \sigma^2;$$

where μ and s are obtained by removing a mean and a variance of the equivalent received signal of the stream ONI from Observation Node ONI.

At sub-step b), a likelihood probability llr∈$R^{4 \times 1}$ and a belief probability Pro∈$R^{4 \times 2 \cdot flow}$ are calculated. For a symbol position index i={1,2,3,4}, $$llr(i) = \ln \frac{Pr(Y_{bp}(ONI) \mid X(ONI) = 3\sqrt{10})}{Pr(Y_{bp}(ONI) \mid X(ONI) = si(i)/\sqrt{10})} =$$

$$\frac{(2 \cdot (Y_{bp}(ONI) - \mu) - R(ONI, ONI) \cdot (si(i) + 3)/\sqrt{10}) \cdot R(ONI, ONI) \cdot (si(i) - 3)/\sqrt{10}}{s^2}$$

where llr(i) denotes a likelihood ratio of an ONI$^{th}$ stream symbol being 3/$\sqrt{10}$ to being si(i)/$\sqrt{10}$.

A temporary belief probability is then calculated. For a symbol position index i={1,2,3,4}, proT(i)=exp($llr$(i))/$\Sigma_i$ exp($llr$(i));

where proT(i) denote a probability of the ONI$^{th}$ stream symbol being si(i)/$\sqrt{10}$.

At sub-step c), the ONI$^{th}$ stream is updated with a damping algorithm to obtain:

pro(:,ONI)=df·pro(:,ONI)+(1−df·proT);

where df denotes a damping factor, and df may be set to 0.2 to 0.3.

At S404, a bit-level LLR decision or symbol hard decision is outputted. For a symbol index vector si={3,1,−1,−3}, for a complex constellation point of each stream SNI={1, . . . , flow}, $$rp = \arg \underset{i}{\max} (pro(i, SNI)); \text{ and}$$

$$ip = \arg \underset{i}{\max} (pro(i, SN + \text{flow}));$$

where pro(rp,SNI) and pro(ip,SNI+flow) denote LLR probabilities of the SNI$^{th}$ stream real value symbol, which may be used as decoding module input or used for other purposes as required.

For a symbol hard decision, $$\hat{X}(SNI) = \frac{(si(rp) + si(ip) \cdot j)}{\sqrt{10}};$$

where $\hat{X}(SNI)$ denotes a hard decision value of per stream 16QAM symbol.

It is to be understood that, in this embodiment, the BP equalization method according to this embodiment is illustrated with only two application scenarios based on 4QAM and 16QAM. Application scenarios based on 64QAM and 256QAM may be deduced by analogy with reference to the above embodiments, which are not described in detail herein. Besides, it is to be understood that the BP equalization method according to this embodiment is applicable to QAM of any order.

Example Embodiment Three

Figure 5:
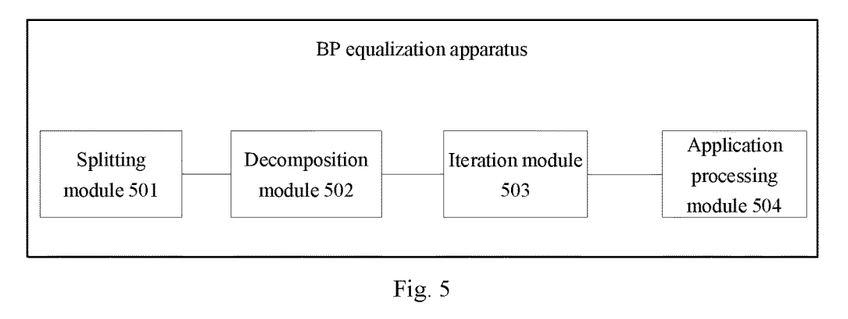
FIG. 5 is a schematic structural diagram of a BP equalization apparatus according to example embodiment three of the present disclosure.

This embodiment provides a BP equalization apparatus. The BP equalization apparatus may be arranged in a communication device. The communication device may include at least one of a user-side communication device and a network-side communication device. Refer to FIG. 5, the BP equalization apparatus according to this embodiment may include a splitting module 501, a decomposition module 502 and an iteration module 503.

The splitting module 501 is configured to split a received signal $Y_c$, a channel estimation $H_c$ and a symbol estimation $X_c$ into real parts and imaginary parts to obtain a received signal matrix Y, a channel estimation matrix H and a symbol estimation matrix X.

In this embodiment, the splitting module 501 splits a complex field QAM constellation point into two real number field PAM constellation points to allow for a real number field operation in subsequent steps.

In this embodiment, the splitting module 501 may flexibly arrange a receiving model according to a specific application scenario. In an example, for the received signal $Y_c$, the channel estimation $H_c$ and the symbol estimation $X_c$, the receiving model may be arranged as follows:

$$Y_c = H_c X_c + N_c;$$

where the received signal satisfies $Y_c \in C^{ante \times 1}$; the channel estimation satisfies $H_c \in C^{ante \times flow}$; the symbol estimation satisfies $X_c \in C^{flow \times 1}$; the white Gaussian noise satisfies $N_c \in C^{ante \times 1}$, with a mean of 0 and a variance of $2 \cdot \sigma^2$; C denotes a complex field; ante denotes the number of antennas; flow denotes the number of streams; and $\sigma^2$ denotes a noise power.

Correspondingly, a received signal matrix Y, a channel estimation matrix H and a symbol estimation matrix X obtained through splitting into real parts and imaginary parts by the splitting module 501 satisfy:

$$Y = HX + N;$$

the received signal matrix is $$Y = \begin{bmatrix} \text{Re}\{Y_c\} \\ \text{Im}\{Y_c\} \end{bmatrix} \in R^{2 \cdot ante \times 1};$$

the channel estimation matrix is $$H = \begin{bmatrix} \text{Re}\{H_c\} & -\text{Im}\{H_c\} \\ \text{Im}\{H_c\} & \text{Re}\{H_c\} \end{bmatrix} \in R^{2 \cdot ante \times 2 \cdot flow};$$

the symbol estimation matrix is $$X = \begin{bmatrix} \text{Re}\{X_c\} \\ \text{Im}\{X_c\} \end{bmatrix} \in R^{2 \cdot flow \times 1};$$

Re{.} denotes taking a real part, and Im{.} denotes taking an imaginary part.

The decomposition module 502 is configured to perform QR decomposition on the channel estimation matrix H to obtain an equivalent received signal $Y_{bp}$, an equivalent channel R and a noise power $\sigma^2$.

In an example of this embodiment, the decomposition module 502 performs QR decomposition on the channel estimation matrix H to obtain:

$$Y = HX + N = QRX + N;$$

and according to Y=HX+N=QRX+N, the decomposition module 502 obtains:

$$Y_{bp} \triangleq Q^T Y = RX + Q^T N \in R^{2 \cdot flow \times 1};$$

where the equivalent noise $Q^T N$ has a mean of 0, and the noise power is $\sigma^2$.

The QR decomposition performed by the decomposition module 502 on the channel estimate $H = QR \in R^{2 \cdot ante \times 2 \cdot flow}$ has at least the following advantages. 1) The equivalent channel R has a dimension of $R \in R^{2 \cdot flow \times 2 \cdot flow}$, which under Massive MIMO, is much smaller than an original channel dimension $H \in R^{2 \cdot ante \times 2 \cdot flow}$, thereby greatly reducing the complexity of subsequent iterative algorithms. 2) According to characteristics of a unitary matrix, var($Q^T N$)=var(N), that is, the noise power is constant, where var(.) denotes a variance. 3) Since R denotes an upper triangular matrix, only non-zero elements need to be updated in subsequent iteration, which can further reduce the computation overhead.

The iteration module 503 is configured to perform iteration based on the equivalent received signal $Y_{bp}$, the equivalent channel R and the noise power $\sigma^2$ to obtain a position probability of per stream symbol.

For example, to be continued with the above example, the performing, by the iteration module 503, iteration based on the equivalent received signal $Y_{bp}$, the equivalent channel R and the noise power $\sigma^2$ to obtain a position probability of per stream symbol may include: constructing, by the iteration module 503, a fully connected BP network by taking the equivalent received signal $Y_{bp}$ as an Observation Node and the symbol estimation matrix X as a Symbol Node, and initializing a per stream symbol position probability as $$Pro = \frac{1}{M} \cdot I_{M \times 2 \cdot flow},$$

M being an order of QAM, that is, $2^M$ QAM; and then performing the following calculation: calculating, by the iteration module 503, an equivalent received signal mean $S_{u,ONI}$ and an equivalent received signal variance estimate $S_{\sigma^2, ONI}$ on each observation node index ONI={2·flow, . . . , 1}. To be continued with the above example, the process may include:

$$S_{u,ONI} = \sum_{SNI=ONI}^{2\cdot flow} R(ONI, SNI) \cdot \left(\sum_{i=1}^{M} si(i) \cdot pro(i, SNI)\right) / \beta;$$

and $$S_{\sigma^2,ONI} = \sum_{SNI=ONI}^{2\cdot flow} |R(ONI, ONI)|^2 \cdot \left(\sum_{i=1}^{M} (si(i))^2 \cdot pro(i, SNI)\right) / \beta^2 + \sigma^2;$$

where $$\left(\sum_{i=1}^{M} si(i) \cdot pro(i, SNI)\right) / \beta$$

denotes a per stream estimate, $$\left(\sum_{i=1}^{M} (si(i))^2 \cdot pro(i, SNI)\right) / \beta^2$$

denotes a per symbol variance estimate, SNI denotes a stream index, and $\beta$ denotes a symbol energy normalization factor. For example, for 4QAM, 16QAM, 64QAM and 256QAM, values of $\beta$ are $\sqrt{2}$, $\sqrt{10}$, $\sqrt{42}$, $\sqrt{150}$, respectively. QAM of other orders may be deduced by analogy, which are not described in detail herein.

After the equivalent received signal mean $S_{u,ONI}$ and the equivalent received signal variance estimate $S_{\sigma^2,ONI}$ are obtained, the iteration module 503 may calculate a per stream symbol likelihood probability $llr \in R^{M\times 1}$ and a per stream belief probability $proT \in R^{M\times 1}$ according to $S_{u,ONI}$ and $S_{\sigma^2,ONI}$.

In this embodiment, in order to further improve the accuracy of symbol estimation in the equalization algorithm, before the iteration module 503 calculates the per stream symbol likelihood probability $llr \in R^{M\times 1}$ and the per stream belief probability $proT \in R^{M\times 1}$ according to $S_{u,ONI}$ and $S_{\sigma^2,ONI}$, a mean and a variance of a stream ONI may be removed from the equivalent received signal mean $S_{u,ONI}$ and the equivalent received signal variance estimate $S_{\sigma^2,ONI}$ according to a principle of Extrinsic Information to obtain $\mu$ and s. The process is as follows:

$$\mu = S_{u,ONI} - R(ONI, ONI) \cdot \left(\sum_{i=1}^{M} si(i) \cdot pro(i, ONI)\right) / \beta; \text{ and}$$

$$s = S_{\sigma^2,ONI} - |R(ONI, ONI)|^2 \cdot \left(\sum_{i=1}^{M} (si(i))^2 \cdot pro(i, ONI)\right) / \beta^2 + \sigma^2.$$

where $\mu$ and s obtained above are obtained by removing a mean and a variance of the equivalent received signal of the ONI stream from Observation Node ONI.

In the above step, since R is an upper triangular matrix, only ONI={2·flow, ..., 1} and SNI={ONI, ..., 2·flow} need to be traversed. In this way, iteration overhead of the QR-GAI algorithm can be further reduced. In addition, GAI white noise estimation (GAI estimation performance deteriorates significantly under high channel correlation) is not required for nodes of ONI=2·flow due to the absence of inter-stream interference. Therefore, a Log Likelihood Ratio (LLR) belief probability is high, which makes the iterative algorithm have dominant nodes in the iteration, thereby improving the estimation performance of the overall iterative algorithm.

In an example of this embodiment, the iteration module 503 calculates a per stream symbol likelihood probability and a per stream belief probability $proT \in R^{M\times 1}$ according to the equivalent received signal mean $S_{u,ONI}$ and the equivalent received signal variance estimate $S_{\sigma^2,ONI}$.

The process of calculating, by the iteration module 503, the per stream symbol likelihood probability $llr \in R^{M\times 1}$ includes:

defining a symbol index vector $$si = \left\{2^{\frac{M}{2}}-1, 2^{\frac{M}{2}}-3, \ldots, -2^{\frac{M}{2}}+1\right\} \in R^{2^{\frac{M}{2}}\times 1},$$

and for an index i=1, 2, ..., M, calculating the per stream symbol likelihood probability $llr \in R^{M\times 1}$ according to the following formulas:

$$llr(i) = \ln\frac{Pr(Y_{bp}(ONI) \mid X(ONI) = si(0)/\beta)}{Pr(Y_{bp}(ONI) \mid X(ONI) = si(i)/\beta)} =$$

$$\frac{(2 \cdot (Y_{bp}(ONI) - \mu) - R(ONI, ONI) \cdot (si(i) + si(0))/\beta) \cdot R(ONI, ONI) \cdot (si(i) - si(0))/\beta}{s^2}$$

where llr(i) denotes a likelihood ratio of the symbol X(ONI) being si(0)/$\beta$ to being si(i)$\beta$ at an $i^{th}$ symbol position, i=1, 2, ..., M.

Then, the iteration module 503 calculates the per stream belief probability $proT \in R^{M\times 1}$ according to the following formulas:

$$proT(i)=\exp(llr(i))/\Sigma_i \exp(llr(i));$$

where proT(i) denotes a probability that an $ONI^{th}$ stream symbol X(ONI) is si(i)/$\beta$.

In some examples of this embodiment, in order to prevent probability jumps in adjacent iteration cycles, the performing, by the iteration module 503, iteration based on the equivalent received signal $Y_{bp}$, the equivalent channel R and the noise power $\sigma^2$ to obtain a position probability of per stream symbol may further include updating the $ONI^{th}$ stream symbol with the following damping algorithm:

$$pro(:,ONI)=df \cdot pro(:,ONI)+(1-df)proT);$$

where pro(:,ONI) denotes all rows and ONI columns, and df denotes a damping factor. The value of df in this embodiment may be flexibly determined. In an example, the value may be any value from 0.2 to 0.3.

In this embodiment, after the iteration module 503 obtains the per stream symbol position probability, the obtained per stream symbol position probability may be applied flexibly as required. For example, referring to FIG. 5, the BP equalization apparatus further includes an application processing module 504.

In an example of this embodiment, the application processing module 504 may calculate a complex QAM constellation point of per stream symbol SNI={1, ..., flow} by utilizing the obtained per stream symbol position probability, so as to output a per stream symbol bit-level LLR probability.

The calculating, by the application processing module 504, a complex QAM constellation point of per stream symbol SNI={1, ..., flow} includes:

$$rp = \arg\max_i(pro(i, SNI)); \text{ and}$$

$$ip = \arg\max_i(pro(i, SNI+\text{flow}));$$

where pro(rp,SNI) and pro(ip,SNI+flow) denote probabilities of real-value symbol positions of a real part and an imaginary part of an SNI$^{th}$ stream.

In some examples, pro(rp,SNI) and pro(ip,SNI+flow) may be directly used as decoding module input. In some examples, the application processing module 504 in this embodiment may be further configured to calculate a symbol hard decision, including:

$$\hat{X}(SNI) = \frac{(si(rp) + si(ip) \cdot j)}{\beta};$$

where $\hat{X}(SNI)$ denotes a hard decision value of a per stream $2^M$ QAM complex symbol, and j denotes the imaginary part.

Example Embodiment Four

Figure 6:
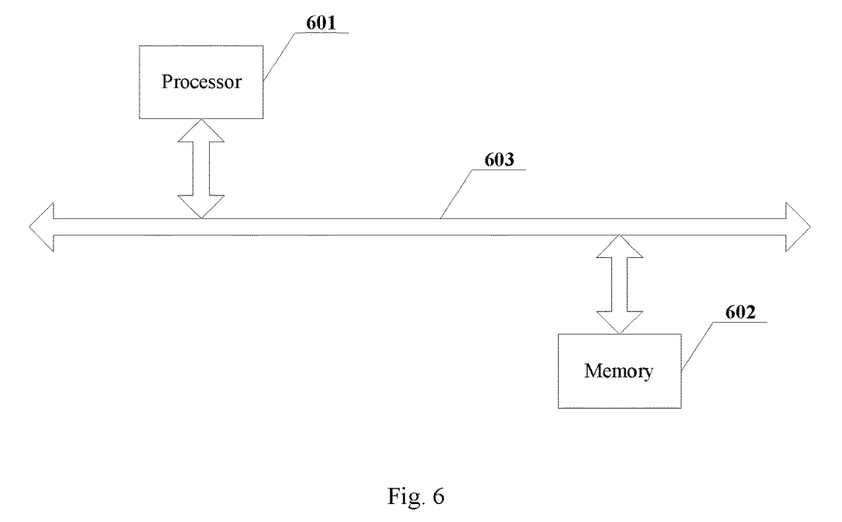
FIG. 6 is a schematic structural diagram of a communication device according to example embodiment four of the present disclosure.

This embodiment further provides a communication device. The communication device may be a user-side device, for example, a variety of user-side user equipment (e.g., user terminals), or a network-side communication device, such as various AAUs (e.g., base station devices). Referring to FIG. 6, the communication device includes a processor 601, a memory 602 and a communication bus 603.

The communication bus 603 is configured to realize communication connection between the processor 601 and the memory 602.

In an example, the processor 601 may be configured to execute one or more computer programs stored in the memory 602, so as to carry out the BP equalization method in the above embodiment.

Figure 7:
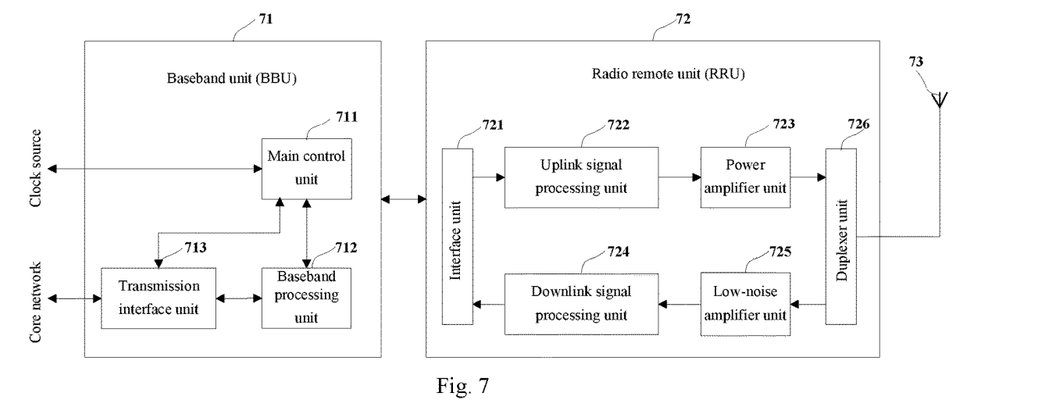
FIG. 7 is a schematic structural diagram of a base station according to example embodiment four of the present disclosure.

For easy understanding, a description is given in an example of this embodiment by taking a base station as the communication device. Moreover, it is to be understood that the base station of this embodiment may be a cabinet macro base station, a distributed base station or a multi-mode base station. Referring to FIG. 7, the base station of this example includes a building base band unit (BBU) 71, a radio remote unit (RRU) 72 and an antenna 73.

The BBU 71 is configured to perform centralized control and management of the entire base station system and uplink and downlink baseband processing and provide physical interfaces for information interaction with the radio remote unit and a transport network. According to different logic functions, as shown in FIG. 7, the BBU 71 may include a baseband processing unit 712, a main control unit 711 and a transmission interface unit 713. The main control unit 711 is configured mainly to provide functions such as control and management of the BBU, signaling processing, data transmission, interaction control and system clock provision. The baseband processing unit 712 is configured to perform baseband protocol processing such as signal coding and modulation, resource scheduling and data encapsulation and provide an interface between the BBU and the RRU. The transmission interface unit 713 is configured to provide a transmission interface connected to a core network. In the example, the above logical function units may be distributed on different physical boards or may be integrated on the same board. Optionally, the baseband unit 71 may be of a structure in which the baseband processing unit is integrated with the main control unit or a structure in which the baseband processing unit is separated from the main control unit. In the structure in which the baseband processing unit is integrated with the main control unit, main control, transmission, and baseband are integrally designed. That is, the baseband processing unit, the main control unit and the transmission interface unit are integrated on the same physical board. This structure has a higher reliability, a lower delay, a higher resource sharing and scheduling efficiency, and a lower power consumption. In the structure in which the baseband processing unit is separated from the main control unit, the baseband processing unit and the main control unit are distributed on different boards, which correspond to a baseband board and a main control board, respectively. This structure allows for free combination between boards, facilitating flexible expansion of the baseband. In practical application, the arrangement flexibly depends on requirements.

The RRU 72 is configured to communicate with the BBU through a baseband radio frequency (RF) interface to complete conversion between a baseband signal and an RF signal. Referring to FIG. 7, an example RRU 72 mainly includes an interface unit 721, a uplink signal processing unit 724, an downlink signal processing unit 722, a power amplifier unit 723, a low-noise amplifier unit 725 and a duplexer unit 726. These units constitute a downlink signal processing link and an uplink signal processing link. The interface unit 721 is configured to provide a forward interface with the BBU and receive and send a baseband IQ signal. The downlink signal processing unit 722 is configured to perform signal processing functions such as signal up-conversion, digital-to-analog conversion and RF modulation. The uplink signal processing unit 724 is mainly configured to perform functions such as signal filtering, mixing, analog-to-digital conversion and down-conversion. The power amplifier unit 723 is configured to amplify a downlink signal and then send the amplified downlink signal through the antenna 73 to, for example, a terminal device. The low-noise amplifier unit 725 is configured to amplify an uplink signal received by the antenna 73 and then send the amplified uplink signal to the uplink signal processing unit 724 for processing. The duplexer unit 726 supports multiplexing and filtering of received and sent signals.

Additionally, it is to be understood that the base station of this embodiment may also use a Central Unit-Distributed Unit (CU-DU) architecture. The DU is a distributed access point responsible for underlying baseband protocol and RF processing. The CU is responsible for higher-layer protocol processing and centralized management of DUs. The CU and the DU jointly perform baseband and RF processing of the base station.

In this embodiment, the base station may further include a storage unit for storing various data. For example, the storage unit may store the one or more computer programs. The main control unit or the CU may be used as a processor to execute the one or more computer programs stored in the storage unit to carry out the BP equalization method of the above embodiments.

In this example, when the BP equalization apparatus is disposed in the base station, the functions of at least one module of the BP equalization apparatus may also be implemented by the main control unit or the central unit.

Figure 8:
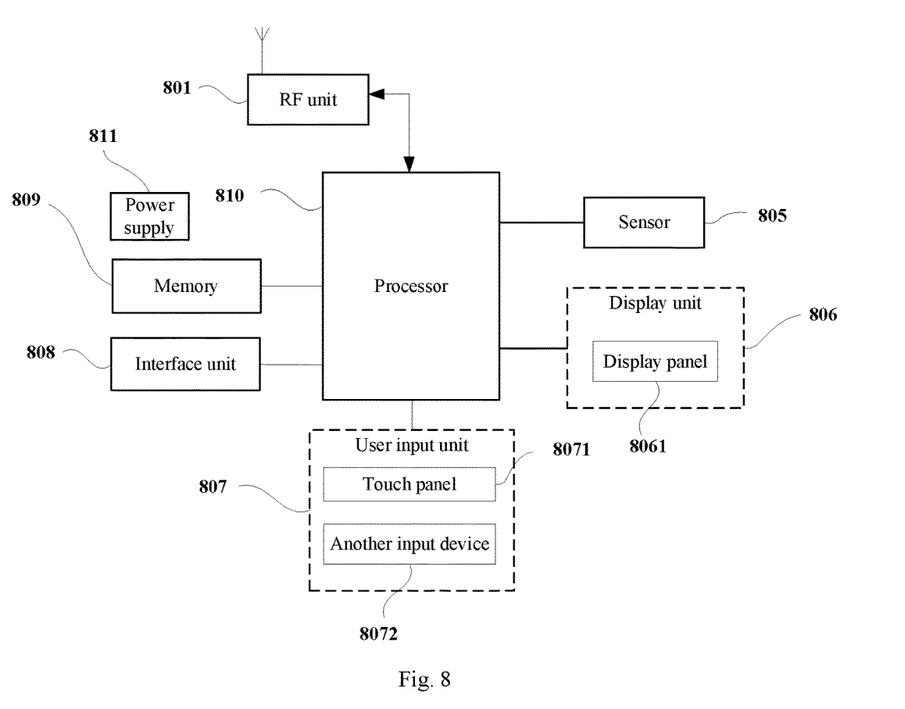
FIG. 8 is a schematic structural diagram of a communication terminal according to example embodiment four of the present disclosure.

For easy understanding, a description is given in another example of this embodiment by taking a communication terminal as the communication device. Referring to FIG. 8, the communication terminal may be a mobile terminal having a communication function, for example, a mobile phone, a tablet computer, a notebook computer, a palmtop computer, a personal digital assistant (PDA), a navigation device, a wearable device or a smart band. The communication terminal may include an RF unit 801, a sensor 805, a display unit 806, a user input unit 807, an interface unit 808, a memory 809, a processor 810 and a power supply 811. It is to be understood by those having skills in the art that the communication terminal is not limited to the structure of the communication terminal shown in FIG. 8. The communication terminal may include more or fewer components than the components illustrated, or a combination of some of the components illustrated, or may include components arranged in a different manner than the components illustrated.

The RF unit 801 may be configured for communication, that is, receiving and sending signals. For example, the RF unit 801 receives downlink information from the base station and sends the received downlink information to the processor 810 for processing. Moreover, the RF unit 801 sends uplink data to the base station. Generally, the RF unit 801 includes, but not limited to, an antenna, at least one amplifier, a transceiver, a coupler, a low-noise amplifier and a duplexer. Moreover, the RF unit 801 may also communicate with a network and other devices by way of wireless communication. The sensor 805 may be, for example, a light sensor, a motion sensor or other sensors. In an embodiment, the light sensor includes an ambient light sensor or a proximity sensor. The ambient light sensor may adjust the brightness of a display panel 8061 according to the brightness of the ambient light.

The display unit 806 is configured to display information inputted by or provided for a user. The display unit 806 may include a display panel 8061, for example, an organic light-emitting diode (OLED) display panel or an active-matrix organic light-emitting diode (AMOLED) display panel.

The user input unit 807 may be configured to receive input digital or character information and generate key signal input related to user settings and function control of the mobile terminal. The user input unit 807 may include a touch panel 8071 and another input device 8072.

The interface unit 808 serves as an interface through which at least one external device can be connected to the communication terminal. For example, the external device may include an external power supply (or battery charger) port, a wired or wireless data port, a memory card port, a port for connecting an apparatus having an identification module, an audio input/output (I/O) port and the like.

The memory 809 may be configured to store software programs and various data. The memory 809 may include a high-speed random-access memory and may also include a non-volatile memory such as at least one disk memory, a flash memory device or another volatile solid-state memory.

As the control center of the communication terminal, the processor 810 is configured to connect various parts of the communication terminal by various interfaces and lines and perform various functions and data processing of the communication terminal by executing software programs and/or modules stored in the memory 809 and invoking data stored in the memory 809. For example, the processor 810 may be configured to invoke the one or more computer programs stored in the memory 809 to carry out the BP equalization method as described above.

The processor 810 may include one or more processing units. In an embodiment, an application processor and a modem processor may be integrated into the processor 810. The application processor is configured to process an operating system, a user interface and an application program. The modem processor is configured to process wireless communication. It is to be understood that the modem processor may not be integrated into the processor 810.

The power supply 811 (for example, a battery) may be logically connected to the processor 810 through a power management system to perform functions such as charging management, discharging management and power consumption management through the power management system.

In this example, when the BP equalization apparatus is disposed in the communication terminal, the functions of at least one module of the BP equalization apparatus may also be implemented by the processor 810.

This embodiment further provides a computer-readable storage medium. The computer-readable storage medium includes a volatile or non-volatile medium, removable or non-removable medium implemented in any method or technology for storing information (such as computer-readable instructions, data structures, computer program modules or other data). The computer-readable storage medium includes, but is not limited to, a random-access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a magnetic cassette, a magnetic tape, a magnetic disk or another magnetic storage device, or any other medium that can be used for storing desired information and accessed by a computer.

In an example, the computer-readable storage medium of the embodiment may be configured to store one or more computer programs which, when executed by one or more processors, cause the one or more processors to carry out the BP equalization method of the above embodiments.

This embodiment further provides a computer program (or computer software) that may be distributed in a computer-readable medium and executed by a computing device to cause the computing device to perform at least one step of the BP equalization method of the above embodiments. Moreover, in some cases, the illustrated or described at least one step may be performed in a sequence different from the sequence described in the above embodiments.

This embodiment further provides a computer program product. The computer program product includes a computer-readable apparatus having stored thereon the computer programs as illustrated above. In this embodiment, the computer-readable apparatus may include the computer-readable storage medium as illustrated above.

In the BP equalization method and apparatus, the communication device and the storage medium according to the embodiments of the present disclosure, firstly, a received signal $Y_c$, a channel estimation $H_c$ and a symbol estimation $X_c$ are split into real parts and imaginary parts to obtain a received signal matrix Y, a channel estimation matrix H and a symbol estimation matrix X; then, QR decomposition is performed on the channel estimation matrix H to obtain an equivalent received signal $Y_{bp}$, an equivalent channel R and a noise power $\sigma^2$, and iteration is performed based on the equivalent received signal $Y_{bp}$, the equivalent channel R and the noise power $\sigma^2$ to obtain a position probability of per stream symbol. Due to the QR decomposition, an update dimension is the number of streams multiplied by the number of streams, which does not increase with the number of antennas, achieving dimensionality reduction and being more suitable for Massive MIMO multi-user detection scenarios of large-scale array antennas. That is, application scenarios of the BP equalization method are improved. At the same time, an R matrix is an upper triangular matrix, and only non-zero nodes need to be iterated during iteration, so the computation overhead can be further reduced and the accuracy of symbol estimation in the equalization algorithm can be improved.

In the embodiments of the present disclosure, the noise power can also be ensured to be constant during dimensionality reduction by utilizing characteristics of a unitary matrix.

During information iterative update, according to the SIC principle, the use of the principle of canceling inter-stream interference of a last stream without a GAI algorithm and the optimal use of a damping filtering method can ensure the high belief probability of nodes, thereby improving the accuracy of the overall multi-user detection and accelerating the convergence speed.

As can be seen, it is to be understood by those having ordinary skills in the art that some or all steps of the method and function modules/units in the system or apparatus may be implemented as software (which may be implemented by computer program codes executable by a computing device), firmware, hardware and suitable combinations thereof. In the hardware implementation, the division of the function modules/units mentioned in the above description may not correspond to the division of physical components. For example, one physical component may have multiple functions, or one function or step may be performed jointly by several physical components. Some or all physical components may be implemented as software executed by a processor such as a central processing unit, a digital signal processor or a microprocessor, may be implemented as hardware, or may be implemented as integrated circuits such as application-specific integrated circuits.

Additionally, as is known to those having ordinary skills in the art, communication media generally include computer-readable instructions, data structures, computer program modules, or other data in carriers or in modulated data signals transported in other transport mechanisms and may include any information delivery medium. Therefore, the present disclosure is not limited to any particular combination of hardware and software.

The above is a detailed description of embodiments of the present disclosure in conjunction with specific implementations and is not to be construed as limiting the scope of the present disclosure. For those having ordinary skills in the art to which the present disclosure pertains, simple deductions or substitutions may be made without departing from the concept of the present disclosure and are considered to fall within the scope of the present disclosure.

The invention claimed is:

1. A Belief Propagation (BP) equalization method applied to a communication device, comprising:
splitting a received signal $Y_c$, a channel estimation $H_c$ and a symbol estimation $X_c$ into real parts and imaginary parts to obtain a received signal matrix Y, a channel estimation matrix H and a symbol estimation matrix X;
performing orthogonal triangular (QR) decomposition on the channel estimation matrix H to obtain an equivalent received signal $Y_{bp}$, an equivalent channel R and a noise power $\sigma^2$; and
performing iteration based on the equivalent received signal $Y_{bp}$, the equivalent channel R and the noise power $\sigma^2$ to obtain a position probability of per stream symbol;

wherein performing iteration based on the equivalent received signal $Y_{bp}$ the equivalent channel R and the noise power $\sigma^2$ to obtain a position probability of per stream symbol comprises:
constructing a fully connected BP network by taking the equivalent received signal $Y_{bp}$ as an observation node and the symbol estimation matrix X as an information node, and
initializing a per stream symbol position probability as $$Pro = \frac{1}{M} \cdot I_{M \times 2 \cdot flow},$$

M being an order of quadrature amplitude modulation (QAM), $I_{M \times 2, flow}$ being an identity matrix;
calculating an equivalent received signal mean $S_{u,ONI}$ and an equivalent received signal variance estimate $S_{\sigma^2,ONI}$ each observation node index ONI={2·flow, ..., 1}; and
calculating a per stream symbol likelihood probability llr$\in R^{M \times 1}$ and a per stream belief probability proT$\in R^{M \times 1}$ according to the equivalent received signal mean $S_{u,ONI}$ and the equivalent received signal variance estimate $S_{\sigma^2,ONI}$.

2. The BP equalization method of claim 1, wherein:
the received signal $Y_c$, the channel estimation H, and the symbol estimation $X_c$ satisfy:

$$Y_c = H_c X_c + N_c;$$

the received signal matrix Y, the channel estimation matrix H and the symbol estimation matrix X satisfy:

$$Y = HX + N; \text{ and}$$

the received signal satisfies $Y_c \in C^{ante \times 1}$;
the channel estimation satisfies $H_c \in C^{ante \times flow}$;
the symbol estimation satisfies $X_c \in C^{flow \times 1}$;
the white Gaussian noise satisfies $N_c \in C^{ante \times 1}$ with a mean of 0 and a variance of $2 \cdot \sigma^2$
C denotes a complex field; ante denotes the number of antennas;
flow denotes the number of streams;
$\sigma^2$ denotes the noise power; the received signal matrix satisfies $$Y = \begin{bmatrix} \text{Re}\{Y_c\} \\ \text{Im}\{Y_c\} \end{bmatrix} \in R^{2 \cdot ante \times 1};$$

the channel estimation matrix satisfies $$H = \begin{bmatrix} \text{Re}\{H_c\} & -\text{Im}\{H_c\} \\ \text{Im}\{H_c\} & \text{Re}\{H_c\} \end{bmatrix} \in R^{2 \cdot ante \times 2 \cdot flow};$$

the symbol estimation matrix satisfies $$X = \begin{bmatrix} \text{Re}\{X_c\} \\ \text{Im}\{X_c\} \end{bmatrix} \in R^{2 \cdot flow \times 1};$$

Re{·} denotes taking a real part,
Im{·} denotes taking an imaginary part;
R denotes a real number field; ante denotes the number of antennas; and
flow denotes the number of streams.

3. The BP equalization method of claim 2, further comprising:
performing QR decomposition on the channel estimation matrix H to obtain:

$$Y=HX+N=QRX+N;\text{ and}$$

$$Y_{bp} \triangleq Q^TY=RX+Q^TN \in R^{2\cdot flow\times 1};$$

wherein the equivalent noise $Q^TN$ has a mean of 0, and the noise power is $\sigma^2$.

4. The BP equalization method of claim 3, wherein calculating an equivalent received signal mean $S_{u,ONI}$ and an equivalent received signal variance estimate $S_{\sigma^2,ONI}$ on each observation node index ONI={2·flow, . . . , 1} comprises:

$$S_{u,ONI} = \sum_{SNI=ONI}^{2\cdot flow} R(ONI, SNI)\cdot\left(\sum_{i=1}^{M} si(i)\cdot pro(i, SNI)\right)/\beta;\text{ and}$$

$$S_{\sigma^2,ONI} = \sum_{SNI=ONI}^{2\cdot flow} |R(ONI, SNI)|^2 \cdot\left(\sum_{i=1}^{M} (si(i))^2 \cdot pro(i, SNI)\right)/\beta^2 + \sigma^2;$$

wherein $$\left(\sum_{i=1}^{M} si(i)\cdot pro(i, SNI)\right)/\beta$$

denotes a per symbol estimate, $$\left(\sum_{i=1}^{M} (si(i))^2 \cdot pro(i, SNI)\right)/\beta^2$$

denotes a per symbol variance estimate,
SNI denotes a stream index,
β denotes a symbol energy normalization factor,
si denotes a symbol index vector, and
pro (i, SNI) denotes a probability of real-value symbol position i of a real part and an imaginary part of an $SNI^{th}$ stream.

5. The BP equalization method of claim 4, prior to calculating a per stream symbol likelihood probability $llr \in R^{M\times 1}$ and a per stream belief probability $proT \in R^{M\times 1}$ according to the equivalent received signal mean $S_{u,ONI}$ and the equivalent received signal variance estimate $S_{\sigma^2,ONI}$ further comprising removing a mean and a variance of a stream ONI from the equivalent received signal mean $S_{u,ONI}$ and the equivalent received signal variance estimate $S_{\sigma^2,ONI}$ according to a principle of Extrinsic Information to obtain µ and s:

$$\mu = S_{u,ONI} - R(ONI, ONI)\cdot\left(\sum_{i=1}^{M} si(i)\cdot pro(i, ONI)\right)/\beta;\text{ and}$$

$$s = S_{\sigma^2,ONI} - |R(ONI, ONI)|^2 \cdot\left(\sum_{i=1}^{M} (si(i))^2 \cdot pro(i, ONI)\right)/\beta^2 + \sigma^2.$$

6. The BP equalization method of claim 5, wherein calculating a per stream symbol likelihood probability $llr \in R^{M\times 1}$ and a per stream belief probability $proT \in R^{M\times 1}$ according to the equivalent received signal mean $S_{u,ONI}$ and the equivalent received signal variance estimate $S_{\sigma^2,ONI}$ comprises:
defining a symbol index vector $$si = \left\{2^{\frac{M}{2}}-1, 2^{\frac{M}{2}}-3, \ldots, -2^{\frac{M}{2}}+1\right\} \in R^{2^{\frac{M}{2}}\times 1};$$

and
calculating the per stream symbol likelihood probability $llr \in R^{M\times 1}$ and the per stream belief probability $proT \in R^{M\times 1}$ according to the following formulas respectively:

$$llr(i) = \ln\frac{Pr(Y_{bp}(ONI)|X(ONI) = si(0)/\beta)}{Pr(Y_{bp}(ONI)|X(ONI) = si(i)/\beta)}$$

$$= \frac{(2\cdot(Y_{bp}(ONI) - \mu) - R(ONI, ONI)\cdot(si(i) + si(0))/\beta\cdot R(ONI, ONI)\cdot(si(i) - si(0))/\beta}{\sigma^2}$$

and $proT(i) = \exp(llr(i))/\sum_i \exp(llr(i));$ and $proT(i)=\exp(llr(i))/\in_i \exp(llr(i));$ wherein llr(i) denotes a likelihood ratio of the symbol X(ONI) being si(0)/β to being si(i)/β at an $i^{th}$ symbol position, i=1, 2, . . . , M; and proT(i) denotes a probability that an $ONI^{th}$ stream symbol X(ONI) is si(i)/β.

7. The BP equalization method of claim 6, wherein performing iteration based on the equivalent received signal $Y_{bp}$, the equivalent channel R and the noise power $\sigma^2$ to obtain a position probability of per stream symbol further comprises updating the $ONI^{th}$ stream symbol with the following damping algorithm:

$$pro(:,ONI)=df\cdot pro(:,ONI)+(1-df)\cdot proT;$$

wherein pro (:, ONI) denotes all rows and ONI columns, and df denotes a damping factor.

8. The BP equalization method of claim 7, further comprising:
calculating a complex QAM constellation point of per stream symbol SNI={1, . . . , flow}, comprising:

$$rp = \arg\max_i(pro(i, SNI));\text{ and}$$

$$ip = \arg\max_i(pro(i, SNI+flow));$$

wherein pro(rp,SNI) and pro(ip,SNI+flow) denote probabilities of real-value symbol positions of a real part and an imaginary part of an $SNI^{th}$ stream.

9. The BP equalization method of claim 8, further comprising:
calculating a symbol hard decision, comprising:

$$\hat{X}(SNI) = \frac{(si(rp) + si(ip)\cdot j)}{\beta};$$

wherein X̂(SNI) denotes a hard decision value of a per stream $2^M$ QAM complex symbol, and j denotes the imaginary part.

10. A Belief Propagation (BP) equalization apparatus applied to a communication device, comprising:
a splitting module configured to split a received signal $Y_c$, a channel estimation $H_c$ and a symbol estimation $X_c$ into real parts and imaginary parts to obtain a received signal matrix Y, a channel estimation matrix H and a symbol estimation matrix X;
a decomposition module configured to perform QR decomposition on the channel estimation matrix H to obtain an equivalent received signal $Y_{bp}$, an equivalent channel R and a noise power $\sigma^2$; and
an iteration module configured to perform iteration based on the equivalent received signal $Y_{bp}$, the equivalent channel R and the noise power $\sigma^2$ obtain a position probability of per stream symbol;
wherein the iteration module is configured to:
construct a fully connected BP network by taking the equivalent received signal $Y_{bp}$ as an observation node and the symbol estimation matrix X as an information node, and
initialize a per stream symbol position probability as $$Pro = \frac{1}{M} \cdot I_{M \times 2 \cdot flow},$$

M being an order of quadrature amplitude modulation (QAM), $I_{M \times 2, flow}$ being an identity matrix;
calculate an equivalent received signal mean $S_{u,ONI}$ and an equivalent received signal variance estimate $S_{\sigma^2,ONI}$ on each observation node index ONI={2·flow, ..., 1} and
calculate a per stream symbol likelihood probability llr∈ $R^{M \times 1}$ and a per stream belief probability proT∈ $R^{M \times 1}$ according to the equivalent received signal mean $S_{u,ONI}$ and the equivalent received signal variance estimate $S_{\sigma^2,ONI}$.

11. A communication device, comprising:
a memory storing a computer program;
a processor configured to execute the computer program to carry out a Belief Propagation (BP) equalization method applied to the communication device comprising:

splitting a received signal $Y_c$, a channel estimation $H_c$ and a symbol estimation $X_c$ into real parts and imaginary parts to obtain a received signal matrix Y, a channel estimation matrix H and a symbol estimation matrix X;
performing orthogonal triangular (QR) decomposition on the channel estimation matrix H to obtain an equivalent received signal $Y_{bp}$, an equivalent channel R and a noise power $\sigma^2$; and
performing iteration based on the equivalent received signal $Y_{bp}$, the equivalent channel R and the noise power $\sigma^2$ to obtain a position probability of per stream symbol;
wherein performing iteration based on the equivalent received signal $Y_{bp}$, the equivalent channel R and the noise power $\sigma^2$ to obtain a position probability of per stream symbol comprises:
constructing a fully connected BP network by taking the equivalent received signal $Y_{bp}$ as an observation node and the symbol estimation matrix X as an information node, and
initializing a per stream symbol position probability as $$Pro = \frac{1}{M} \cdot I_{M \times 2 \cdot flow},$$

M being an order of quadrature amplitude modulation (QAM), $I_{M \times 2, flow}$ being an identity matrix;
calculating an equivalent received signal mean $S_{u,ONI}$ and an equivalent received signal variance estimate $S_{\sigma^2,ONI}$ on each observation node index ONI={2·flow, ..., 1}; and
calculating a per stream symbol likelihood probability llr∈ $R^{M \times 1}$ and a per stream belief probability proT∈ $R^{M \times 1}$ according to the equivalent received signal mean $S_{u,ONI}$ and the equivalent received signal variance estimate $S_{\sigma^2,ONI}$; and
a communication bus configured to connect the processor to the memory.

12. A non-transitory computer-readable storage medium, storing at least one computer program which, when executed by at least one processor, cause the at least one processor to carry out the Belief Propagation (BP) equalization method applied to a communication device of claim 1.

* * * * *